United States Patent Office 3,043,893
Patented July 10, 1962

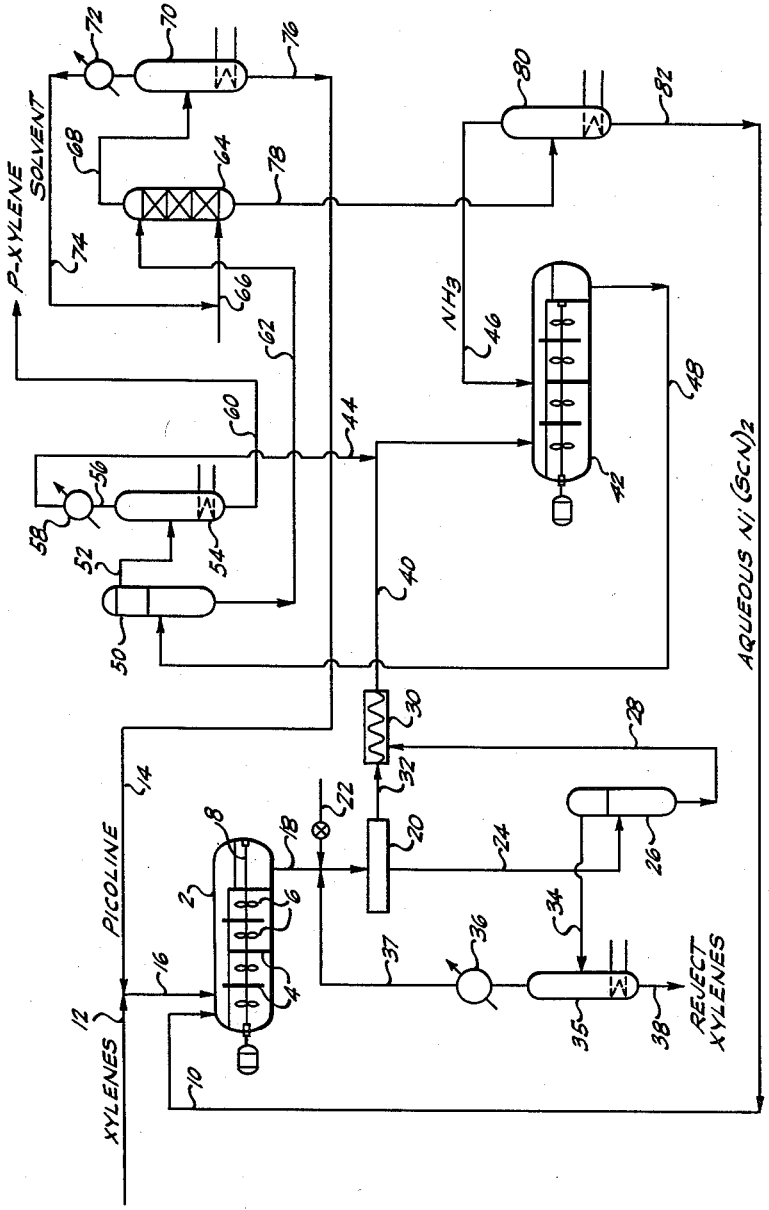

3,043,893
SEPARATION OF ORGANIC COMPOUNDS WITH WERNER COMPLEXES
William D. Schaeffer, Pomona, and Homer E. Rea, Jr., Fullerton, Calif., assignors to Union Oil Company of California, Los Angeles, Calif., a corporation of California
Filed Dec. 28, 1959, Ser. No. 862,224
15 Claims. (Cl. 260—674)

This invention relates to new methods for separating organic compounds such as xylene isomers and the like by the general method of selective clathration with heterocyclic nitrogen base Werner complexes of metal salts. Broadly speaking, it concerns a novel method of carrying out the clathration and de-clathration steps in aqueous media. More specifically, a volatile, strong nitrogen base such as ammonia is used in the de-clathration step to dissolve the clathrate in the aqueous medium, thereby "springing" the selectively clathrated component of the feed mixture. The resulting aqueous phase is then treated by a novel series of steps to remove the volatile base, and regenerate the Werner complex components for re-use in the clathration step. Briefly, the regeneration steps, which form the gist of this invention, consists of (1) extracting the aqueous phase with an immiscible organic solvent to dissolve out the heterocyclic base and recover the same for re-use in the clathration step, and (2) boiling off the volatile nitrogen base (which is then returned to the de-clathration step) from the remaining aqueous phase, thereby regenerating metal salt solution for re-use in the clathration step.

In the copending application of William D. Schaeffer, Serial No. 862,223, it has been shown that aqueous solutions of strong nitrogen bases such as ammonia are good solvents for the water-insoluble Werner complexes of heterocyclic nitrogen bases with metal salts, and also for the clathrate compounds thereof. The process there disclosed involves carrying out the clathration step by evaporating volatile base from the aqueous clathration medium while in intimate contact with the feed mixture, thereby precipitating the clathrate, and then adding volatile base to the aqueous de-clathration medium to redissolve the clathrate. A disadvantage of this process is that the evaporation of ammonia or other volatile base during clathration requires the use of either high temperatures or low pressures. If high temperatures are utilized, the efficiency of clathration is impaired; if low pressures are used, the cost in equipment and utilities is greatly increased. The principal objectives of this invention are therefore to eliminate the volatile base from the clathration step, while at the same time recovering the Werner complex components from the de-clathration step in suitable form for precipitation-clathration with the feed mixtures. Precipitating the clathrate from solution while in intimate contact with the feed mixture is a more efficient clathration technique than merely contacting pre-formed solid Werner complex with the feed. Pre-formed solid Werner complex could of course be easily recovered from the de-clathration step by merely boiling off the volatile base, thereby precipitating solid Werner complex.

The present invention is based upon our unexpected discovery that the heterocyclic nitrogen base of the Werner complex can be quantitatively extracted from solutions of the Werner complex in aqueous strong nitrogen base solutions. Following extraction of the heterocyclic base, the volatile nitrogen base can then be removed by boiling at atmospheric pressure, leaving an aqueous solution of the metal salt, e.g. nickel thiocyanate. The salt solution is then admixed with the xylene feed and with the extracted heterocyclic base, resulting in rapid precipitation of the desired clathrate in an environment of intimate contact with the feed.

The "clathration" mechanism of the present invention differs from that of the classical forms of clathration, as described for example by Powell (J. Chem. Soc. (London) 1948 pp. 61–73). The classical clathrate formers are non-versatile; they will form stable clathrates only with foreign molecules of one particular dimension, coinciding with the dimensions of the crystal void spaces of the clathrate former. But the organic Werner complex clathrate formers described herein are found to be versatile in their clathrating properties. It is not essential that the included foreign molecules coincide in size or shape with the pre-existing crystal void spaces of the Werner complex. The same Werner complex will form clathrates with molecules varying widely in size and shape, from for example benzene to anthracene.

Compounds which are predominantly aromatic in character exhibit a markedly greater tendency to form clathrates with the instant Werner complexes than do the less aromatic compounds. However, even when all compounds in the mixture to be separated are equally aromatic in character, one will be selectively clathrated in preference to others. The methods of the present invention are hence applicable to the separation of mixtures of the following types:

(1) Wholly aromatic, i.e., all components are predominantly or significantly aromatic in character. In this case one aromatic compound is selectively clathrated in preference to another, due primarily to steric differences in molecular form.

(2) Partially aromatic, i.e., one component is appreciably more aromatic in character than another. In this case, the more aromatic compound or compounds will in general be selectively clathrated in preference to the less aromatic compound or compounds.

The process of this invention may perhaps be more readily understood with reference to the accompanying drawing which illustrates a suitable continuous modification of the process, employing auxiliary solvents and/or azeotroping agents. This modification will be described with specific reference to the separation of xylene isomers using ammonia as the volatile base, but it will be understood that the same techniques are broadly applicable, with slight modifications, to the separation of other mixtures using other volatile bases within the purview of this invention.

The initial clathration step is effected in a suitable reaction vessel 2, which consists of an elongated tank divided vertically into several communicating compartments by means of staggered baffles 4. Each of the resulting compartments is provided with suitable agitating means to provide substantially uniform mixing throughout at least the major part of the vessel. In the modification illustrated the agitating means consists of a series of propellers 6 attached to a power driven shaft 8. It will be noted that baffles 4 provide essentially a tortuous linear path, directing the fluid flow alternately under one baffle and over the top of the next. Recycle aqueous salt solution is admitted to the inlet end of the reactor via line 10, while feed xylenes are brought in through line 12, admixed with recycle heterocyclic base from line 14, and the resulting solution of heterocyclic base in xylene is admitted to the reactor via line 16. The clathration reaction in reaction vessel 2 proceeds fairly rapidly, and preferably at low temperatures. Residence times in the reactor may range between about 2 minutes and 30 minutes, preferably between about 5 and 20 minutes. Suitable temperatures range between about 0° C. or below up to about 75° C., preferably between about 20° and 50° C.

As will be apparent, the feed xylenes, recycle heterocyclic base, and recycle aqueous salt solution enter the reactor at its left extremity, and the agitated mixture travels generally horizontally toward the right through each of the communicating compartments. Solid clathrate forms concurrently throughout the travel, and the ultimate reaction mixture consists of a denuded aqueous phase, a raffinate xylene phase, and a solid clathrate phase which is normally preferentially wet by, and associated with, the raffinate xylene phase.

Upon the desired completion of clathrate formation, the resulting slurry is withdrawn continuously via line 18 and transferred to a suitable filter 20, or other means for separating solids from liquids, e.g. a centrifuge or settler. It has been found desirable however to admix with the slurry prior to filtering, a suitable paraffinic or naphthenic hydrocarbon via line 22 in order to dilute the raffinate xylene phase, thereby facilitating its separation from the adhering solid clathrate. Also, aromatic hydrocarbons such as xylenes have some slight solvent capacity for the Werner complex, and the addition of paraffinic or naphthenic hydrocarbons is found to reduce substantially the solubility of the Werner complex in the raffinate xylene phase. Any liquid paraffin or naphthene may be used for this purpose, but for additional purposes to be described hereinafter, it is preferred to use hydrocarbons boiling in the range of about 90° to 135° C., e.g. heptane, octane, nonane, or mixed hydrocarbon fractions boiling in this range such as a 120° to 130° C. alkylate fraction.

The filtrate from filter 20 consists of two liquid phases, viz. a raffinate phase comprising reject xylenes and paraffin hydrocarbon, and a lower aqueous phase containing a small amount of dissolved heterocyclic base and Werner complex. This mixture is transferred via line 24 to a settling vessel 26 wherein stratification is allowed to take place. The lower aqueous phase is withdrawn via line 28 and transferred to a suitable mixing device 30, such as a screw conveyor, wherein it is blended with the solid clathrate which is transferred thereto from filter 20 via line 32. In mixer 30, a slurry of clathrate in the aqueous phase is formed which is then conveniently transferred via line 40 to solution tank 42 for treatment as hereinafter described.

The upper hydrocarbon phase in separator 26 is transferred via line 34 to distillation column 35, which serves the primary purpose of separating the paraffin hydrocarbon from the raffinate xylenes, and the secondary but important purpose of stripping from the xylenes any heterocyclic nitrogen base which may have become dissolved therein in reaction vessel 2. The preferred heterocyclic base used herein is 4-methyl pyridine, which boils very close to xylenes and is hence difficultly separable therefrom. By suitably selecting the paraffin hydrocarbon added via line 22, this problem is solved by the formation of a low boiling azeotrope between the nitrogen base and the paraffin hydrocarbon. This azeotrope is taken off via condenser 36 and line 37, as well as any excess paraffin hydrocarbon, and the mixture is continuously recycled to the clathrate slurry in line 18. Thus, once the process is initiated, little or no paraffin need be added via line 32 since it is essentially all recovered for recycle. The heterocyclic base which is recycled with the paraffin in line 37 is mostly dissolved in the aqueous phase of the slurry in line 18, thereby preventing its build-up in the hydrocarbon phase going to column 35. Thus, the unclathrated raffinate xylenes are withdrawn from column 35 via line 38 in substantially pure form.

The aqueous slurry of clathrate from mixer 30 is transferred continuously via line 40 to a suitable solution tank 42, wherein the clathrated para-xylene is to be recovered. To assist in the subsequent recovery of the p-xylene phase, and also to repress the solubility therein of the heterocyclic base, a suitable paraffinic or naphthenic hydrocarbon diluent is preferably added to the solution tank via line 44, along with the clathrate slurry. This hydrocarbon diluent may be the same as the hydrocarbon previously described in reference to column 35, and it may also serve the purpose of an azeotrope former for the subsequent stripping of heterocyclic base from the recovered p-xylene.

Solution tank 42 may be constructed similarly to reaction vessel 2, and will hence not be described in detail. It is ordinarily preferable to maintain temperatures in solution tank 42 similar to those utilized in reaction vessel 2, and hence temperature control measures are omitted, but if desired, the temperature may be raised somewhat to assist in dissolving the clathrate. As in reaction vessel 2, a tortuous linear flow path is maintained in solution tank 42, with suitable agitation to hasten solution of the clathrate. It is not essential to employ agitation in this step of the process, but generally it will be found that the dissolving of clathrate is hastened thereby. The dissolving of clathrate in the aqueous phase is brought about by the continuous dissolving therein of ammonia or other volatile base, which is passed into the solution tank via line 46.

Upon completion of the declathration, or clathrate dissolving reaction, the resulting two-phase liquid mixture, comprising extract xylenes and ammoniacal Werner complex solution, is withdrawn via line 48 and transferred to phase separator 50 wherein the two phases are allowed to stratify. The xylene phase in separator 50 is withdrawn via line 52 and sent to distillation column 54, from which the heterocyclic base-paraffin hydrocarbon azeotrope, plus any excess paraffin hydrocarbon is taken overhead via line 56 and condenser 58 for recycle to line 40. Enriched para-xylene is withdrawn as bottoms from column 54 via line 60.

The para-xylene recovered as above described may be of substantially any desired purity, depending upon the ratio of Werner complex to feed mixture and other factors such as the efficiency of contacting and completeness of clathration in reaction vessel 2. It is ordinarily preferable not to attempt to obtain 100% pure p-xylene in a single stage; it is preferable to employ multi-stage clathration, or de-clathration, where high purity is desired. According to one modification of multi-stage declathration, the clathrate may be partially dissolved in one stage by adding only a part of the ammonia required for complete dissolving, and the dissolution completed in a second stage by adding a sufficient increment of ammonia. The p-xylene (or other clathrated component) recovered from the second stage of dissolving will be of substantially greater purity than the xylene recovered from the first stage. The xylene recovered from the first stage may, if desired, be recycled to the clathration step along with the fresh feed.

The aqueous phase from separator 50, consisting of Werner complex dissolved in aqueous ammonia, is now transferred via line 62 to countercurrent solvent extraction column 64, into the bottom of which flows a suitable immiscible organic solvent via line 66. This solvent may consist of substantially any inert organic liquid which is relatively insoluble in water, and in which the heterocyclic base of the Werner complex is appreciably soluble and the voltatile base is relatively insoluble. Preferably also the solvent should be lower boiling than the heterocyclic base to facilitate recovery of the latter. Suitable solvents include in general the aromatic, naphthenic and paraffinic hydrocarbons, preferably those boiling between about 75° and 130° C., e.g. benzene, cyclohexane, hexane, heptane, mixed alkylate fractions and the like. A preferred solvent consists of a mixture of benzene and cyclohexane. Other solvents may be utilized, including ethers, esters, nitroparaffins, nitrobenzene, halogenated hydrocarbons and the like. Extraction column 64 may be of any conventional design, e.g. a packed column to provide an extended surface area to faciltate contacting of the phases. The solvent rises upwardly and extracts from the aqueous phase substantially all of the heterocyclic base. Generally, about 2 to 10 theoretical stages of extraction are required. Small amounts of the volatile base may also become dissolved but this does not affect the process since the equilibrium amount may simply be recycled with the solvent. Since ammonia is the least soluble of the volatile nitrogen bases, it is preferred for that reason.

The solvent extract is withdrawn from the top of the extraction column via line 68 and transferred to a small fractionating column 70 from which the solvent is recovered as overhead and recycled to extraction column 64 via condenser 72, line 74 and line 66. The heterocyclic nitrogen base is recovered as bottoms from column 70 via line 76 and is recycled to the clathration step via line 14 as previously described.

The aqueous raffinate from extraction column 64 is continuously withdrawn via line 78 and transferred to a small distillation column 80 wherein the solution is simply boiled to drive off the volatile base as overhead via line 46 for re-use in solution tank 42. In this manner the aqueous solution is efficiently stripped of substantially all volatile base, although it is ordinarily unnecessary to remove more than about 90–95% thereof. The stripped aqueous phase from column 80 is withdrawn as bottoms via line 82, and comprises the metal salt componet of the Werner complex in aqueous solution, and is recycled to clathration vessel 2 via line 10, as previously described.

The Werner-type complexes employed herein are made up of at least three components. The fundamental unit is a water-soluble salt of a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium mercury, and molybdenum. Aluminum may also be used in some instances. The preferred metals are those of atomic number 25 to 28 inclusive, i.e. manganese, iron, cobalt and nickel.

The anion of the metal salt may comprise any acid-forming negative radical, the salts of which will form relatively water-insoluble Werner complexes with heterocyclic nitrogen bases. The preferred anions are polyatomic monovalent anions, such as thiocyanate, isothiocyanate, azide, cyanate, isocyanate and cyanide. Other operable anions include formate, acetate, propionate, and the like.

The second major component of the Werner complexes consists of one or more heterocyclic nitrogen base or bases, which are bound to the central metal atom through coordinate bonds. The operative complexes are mainly of the tetra- and hexa-coordinate types, wherein the metal atom is coordinated with four or six atoms of basic nitrogen. The heterocyclic base should be selected so as to give a maximum selective absorption for the particular compound which is to be absorbed into the crystal lattice of the complex. For example, if it is desired to absorb p-xylene, a very suitable nitrogen base is gamma-picoline. Not all nitrogen bases are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. The nitrogen bases should therefore be selected by a judicious combination of theoretical reasoning and actual testing of the complexes with the particular mixture to be separated. The over-all molecular dimensions of the nitrogen base should preferably approximate the molecular size of the compound to be absorbed in the complex.

In general, any heterocyclic nitrogen base may be employed which is sufficiently basic to form coordinate complexes with the above-described salts, but is weaker as a base than the volatile base which is to be used for solubilizing the clathrate. This includes monocyclic and polycyclic compounds, wherein at least one of the heterocycles contains from one to three hetero-N atoms. In overall size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, substituted pyrroles, piperidines, substituted piperidines, and the like.

A particularly preferred class of heterocyclic bases are the resonances-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4 disubstituted pyridines. These compounds form relatively stable Werner complexes capable of selectively forming clathrates stable at room temperatures with a wide variety of aromatic compounds. Suitable substituted pyridines comprise the following:

4-methyl pyridine
4-ethyl pyridine
4-n-propyl pyridine
4-isopropyl pyridine
4-n-butyl pyridine
4-n-hexyl pyridine
4-vinyl pyridine
4-fluoro pyridine
4-chloro pyridine
4-bromo pyridine
4-hydroxy pyridine
4-hydroxymethyl pyridine
4-methoxy pyridine
4-amino pyridine
Methyl isonicotinate
4-cyano pyridine
4-acetyl pyridine
4-chloromethyl pyridine
3-methyl pyridine
3-ethyl pyridine
3-n-propyl pyridine
3-isopropyl pyridine
3-n-butyl pyridine
3-vinyl pyridine
3-chloro pyridine
3-hydroxy pyridine
3-methoxy pyridine
3-acetyl pyridine
3-cyano pyridine
Ethyl nicotinate
3,4-dimethyl pyridine
3,4-diethyl pyridine
3-methyl, 4-ethyl pyridine
4-methyl, 3-ethyl pyridine
4-methyl, 3-n-hexyl pyridine
4-methyl, 3-cyano pyridine
4-chloro, 3-methyl pyridine
4-acetyl, 3-methyl pyridine
4-methoxy, 3-ethyl pyridine
Isoquinoline Many other similar examples could be cited, as will be apparent to those skilled in the art, and the complexes may include only one such base, or a mixture of two or more may be employed, in which case a mixed complex may be formed.

The preferred Werner complexes of monovalent anion salts of this invention may be designated by the following general formula:

$$[A_n X \cdot Z_y]$$

wherein X is the metal atom as above defined, Z is the heterocyclic nitrogen base, A is the anion as above defined, y is a number form 2 to 6, and n is a number from 1 to 3.

Examples of suitable complexes which may be employed are as follows:

[Ni(γpicoline)$_4$(SCN)$_2$]
[Cu(γpicoline)$_4$(SCN)$_2$]
[Hg(γpicoline)$_4$(NNN)$_2$]
[Co(pyridine)$_4$(OCN)$_2$]
[Fe(pyrrole)$_4$(SCN)$_2$]
[Co(γpicoline)$_4$(CN)$_2$]
[Ag(γpicoline)$_2$(NNN)]
[Ni(4-methylpyridine)$_4$(NNN)$_2$]
[Ni(4-n-propylpyridine)$_4$(SCN)$_2$]
[Ni(isoquinoline)$_4$(SCN)$_2$]
[Ni(4-ethylpyridine)$_4$(SCN)$_2$]
[Mn(4-methylpyridine)$_4$(SCN)$_2$]
[Mn(isoquinoline)$_4$(SCN)$_2$]

Obviously, many other complexes similar to the above could be employed, not all of which would give optimum separation of all mixtures but which should be selected to meet the specific peculiarities of the mixture concerned.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25 and 20 parts by weight per part of the feed component to be clathrated. Smaller proportions of complex will generally yield a purer extract, while the larger proportions result in more complete recovery of absorbable components from the feed mixture.

The term "clathrating" as used herein is intended to mean any absorption or adsorption by the herein described Werner complexes of a sorbable organic compound, regardless of the mechanism by which such sorption may take place. The terms "absorbate" or "extract" refer to the total feed component which is absorbed into the clathrate, thus excluding the nitrogen bases, which are bound by coordinate valences. The term "aromatic" is intended to include all resonance-stabilized, cyclic, unsaturated compounds, which exhibit predominantly substitution rather than addition reactions toward electrophilic reagents (cf. Remick A. E., Electronic Interpretations of Organic Chemistry, John Wiley, N.Y., 1943).

A wide variety of feed mixtures may be resolved by the methods described herein. These methods are operative for separating substantially any mixture of organic compounds wherein the components differ in molcular configuration, and wherein at least one component is substantially aromatic in character. By "substantially aromatic" is meant that at least about 20% of the carbon atoms in the molecules to be clathrated are present as digits of an aromatic ring, the term "aromatic" having the meaning hereinafter specified. Any remaining carbon atoms may be present as saturated or unsaturated aliphatic side-chains, or saturated or unsaturated non-aromatic ring systems. Such compounds may contain a total of from 4 to 60 carbon atoms, preferably from 6 to 20.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the heterocyclic base from the Werner complex. In general, the pH of an aqueous mixture of the compounds to be separated should fall between about 4 and the pH of an aqueous solution of the heterocyclic base employed in the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components are as follows: —F, —Cl, —Br, —I, NO$_2$, aryl—NH$_2$, —OR, alkyl—OH, aralkyl—OH, =CO, —CHO, —CN, —SCN, —NCO, —COOR, —COR, —COO—metal, —SR, —CONH$_2$, wherein R is a hydrocarbon radical. Many groups of a similar nature may be present. Functional groups which are generally, though not always, disruptive and to be avoided are —SH, aryl—OH, —COOH, and the like, unless they are first converted to more nearly neutral derivatives.

Examples of mixtures which may be separated herein include the following, but these examples are by no means exhaustive:

(A) Hydrocarbon mixtures:

o-ethyl toluene
p-ethyl toluene
o-ethyl toluene
m-ethyl toluene
p-ethyl toluene
m-ethyl toluene Mesitylene
Pseudocumene Cumene
Mesitylene Cumene
Pseudocumene p-cymene
p-diethylbenzene m-cymene
Mesitylene Prehnitene
Durene Durene
Isodurene Prehnitene
Isodurene Cyclohexane
Benzene Methyl-cyclohexane
Toluene Benzene
n-heptane Benzene
2,3-dimehtyl pentane
Methyl cyclopentane
Benzene
Picene
Chrysene
Picene
1,2,5,6-dibenzanthracene
Tetralin
Naphthalene
Tetralin
Decalin
Diphenyl
Diphenyl methane
Anthracene
Phenanthrene
1-methyl anthracene
1-methyl phenanthrene
Naphthalene
Diphenyl
1-methyl anthracene
2-methyl anthracene
1-methyl naphthalene
2-methyl naphthalene
1-ethyl naphthalene
2-ethyl naphthalene
p-di-n-propyl benzene
Hexamethyl benzene
o-cymene
p-cymene
p-cymene
m-cymene
m-cymene
p-cymene
p-methyl styrene
m-methyl styrene
p-methyl styrene
o-methyl styrene (B) Hydrocarbon-non-hydrocarbon mixtures:
    2,5-dimethyl furan
    Benzene
    Anthraquinone
    Anthracene
    Benzene
    Thiophene
    2-methyl thiophene
    Toluene
    o-xylene
    Thiophene
    Naphthoquinone
    Naphthalene (C) Non-hydrocarbon mixtures:
    o-methyl toluate
    p-methyl toluate
    o-methyl toluate
    m-methyl toluate
    p-methyl toluate
    m-methyl toluate
    1-nitro naphthalene
    2-nitro naphthalene
    1-amino naphthalene
    2-amino naphthalene
    Aniline
    Nitrobenzene o-toluidine
p-toluidine
o-nitrotoluene
p-nitrotoluene
o-dichlorobenzene
p-dichlorobenzene
o-chlorotoluene
p-chlorotoluene
o-methyl anisole
p-methyl anisole
Coumarin
Vanillin
Furan
Thiophene
Sodium p-cresylate
Sodium m-cresylate
Potassium terephthalate
Potassium isophthalate
Dimethyl isophthalate
Dimethyl terephthalate
Dimethyl isophthalate
Dimethyl orthophthalate
Sodium o-toluene sulfonate
Sodium p-toluene sulfonate
Sodium-1-methyl-3-naphthalene sulfonate
Sodium-1-methyl-4-naphthalene sulfonate
Estriol
Estrone
Estriol
Estradiol
Picolinic acid
Nicotinic acid
Thymol
Menthol
2-napthol-6-sodium sulfonate
2-naphthol-8-sodium sulfonate
p-amino benzaldehyde
o-amino benzaldehyde
Benzidine
p-semidine
2,4-dinitro-chloro-benzene
2,5-dinitro-chloro-benzene
Isosafrol
Piperonal
o-vanillin
Isovanillin
o-vanillin
Vanillin
o-phenylene diamine
p-phentidine
Phenacetin
Isoeugenol
Vanillin
p-methyl thiophenol
m-methyl thiophenol
Diazoaminobenzene
p-aminoazobenzene
N,N-dimethyl aniline
Aniline
Methyl benzoate
Ethyl benzoate Terephthalonitrile
Isophthalonitrile p-tolunitrile
m-tolunitrile Methyl salicylate
Methyl p-hydroxy benzoate p-methyl acetanilide
m-methyl acetanilide p-aminobenzenesulfonamide
m-aminobenzenesulfonamide Sodium anthranilate
Sodium phthalamate Alpha-picoline
Beta-picoline 2,4-lutidine
2,4-lutidine It will be noted that some of the foregoing compounds are fairly soluble in water. In general this does not affect the clathration step, but may necessitate using different techniques for recovering the raffinate and extract products from aqueous solution. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

Other volatile bases which may be used in place of ammonia include for example, methylamine, dimethylamine, trimethylamine, methyl-ethylamine, ethylamine, diethylamine, triethylamine, n-propylamine, isopropylamine, n-butylamine, isobutylamine, isoamylamine, and the like. In general any nitrogen base boiling below water, and having a dissociation constant greater than about $10^{-6}$, and greater than the dissociation constant of the heterocyclic base used in the Werner complex, may be used.

The following examples are cited to illustrate more concretely the practice of this process. These examples however should not be construed as limiting in scope.

EXAMPLE I

A typical solution of Werner complex in aqueous ammonia, resulting from dissolving a p-xylene cathrate in aqueous ammonia, was found by analysis to contain 24% by weight of nickel tetra(4-methyl pyridine) dithiocyanate, 16.0% of ammonia, and 60% of water. A 200 gm. sample of such a solution was extracted serially with six 50 ml. portions of benzene. Titration of the benzene extracts showed that removal of the 4-methyl pyridine from the aqueous solution was quantitative with six stages of extraction.

The remaining aqueous solution, free of 4-methyl pyridine, was then refluxed for a few minutes (final temperature=97° C.) to drive off ammonia. The residual solution was an aqueous solution of nickel thiocyanate. Titration of an aliquot indicated that the ammonia content was about 1%.

To a 250 ml. 3-necked flask equipped with a stirrer, condenser and thermometer was added 130 g. of the nickel thiocyanate solution (11.05 wt. percent Ni(SCN)$_2$) and 34 ml. of feed xylenes (Werner complex/p-xylene wt. ratio=10). The mixture was warmed to 40° C. and a total of 32 g. of 4-methyl pyridine was added over a 45 min. period. When addition of 4-methyl pyridine was complete the mixture was cooled to 25° C. and stirred for 15 minutes, then 45 ml. of isooctane were added and after one minute of stirring the mixture was filtered. The solid and liquid phases were worked up for recovery of the extract and raffinate xylene phases. Analyses of the respective xylene phases gave results shown in the table below:

Table 1

| | C8 Aromatic Isomer Distribution | | | | Recovery[1] | |
|---|---|---|---|---|---|---|
| | p-xylene | m-xylene | o-xylene | Et. Bz. | p-xylene | m-xylene |
| Feed | 14.7 | 81.2 | 0.6 | 3.3 | | |
| Clathrated xylenes | 47.8 | 48.4 | 0.3 | 3.5 | 64.4 | 11.6 |
| Raffinate xylenes | 4.5 | 92.1 | 0.5 | 2.9 | 22.4 | 83.6 |

[1] Percent recovery based on feed content of the isomer.

The above analyses show that m-xylene of about 92.1% purity was produced in a single clathration stage, while 64.4% of the p-xylene was extracted from the feed. Clathration of this feed mixture by merely contacting with the same quantity of preformed solid Werner complex under the same conditions of time and temperature gives a p-xylene recovery of less than 50%, resulting in a raffinate xylene containing less than 90% m-xylene. Thus, it is clear that precipitating the clathrate in the presence of the feed is a much more efficient technique.

When other volatile amines, such as methylamine or ethylamine are used in the foregoing example, replacing ammonia on a mole-for-mole basis, susbtantially the same results are obtained.

EXAMPLE II

Other Werner complexes can be substituted for the nickel tetra(4-methylpyridine) dithiocyanate used in Example I to obtain resolutions of similar efficiency, but wherein isomers other than the para-xylene are sometimes selectively clathrated. For example, in treating a xylene mixture containing 20% p-xylene, 45.5% m-xylene, 19.3% o-xylene and 15.3% ethylbenzene, under conditions described in Example I, the isomers selectively clathrated are as follows:

Table 2

| Werner complex | Isomer selectively clathrated |
|---|---|
| 1. Ni(SCN)$_2$·(3-cyano-pyridine)$_4$ | para. |
| 2. Ni(SCN)$_2$·(3-amido-pyridine)$_4$ | para. |
| 3. Ni(SCN)$_2$·(ethylisonicotinate)$_4$ | para. |
| 4. Ni(SCN)$_2$·(4-hydroxymethyl pyridine)$_4$ | ortho. |
| 5. Mn(CN)$_2$·(4-ethylpyridine)$_4$ | ortho. |
| 6. Mn(CNO)$_2$·(4-ethylpyridine)$_4$ | ortho. |
| 7. Ni(SCN)$_2$·(3-ethyl-4-methyl pyridine)$_4$ | meta. |
| 8. Ni(SCN)$_2$·(4-acetylpyridine)$_4$ | Et. Bz. |

EXAMPLE III

The nickel tetra(4-methyl pyridine) dithiocyanate complex of Example I can also be utilized for the separation of non-hydrocarbon di-substituted benzene isomers. For example, in utilizing this complex according to the procedure of Example I, the ortho-, meta- and para-isomers of mixed chloro-toluenes, dichloro benzenes, toluidines, nitro-toluenes and methyl anisoles are effectively resolved, in each case the para-isomer being selectively clathrated.

The complexes of the above examples may be employed for effecting separations of other mixtures, and may be interchanged in the various examples, to effect varying degrees of resolution. Likewise, many similar complexes could be substituted for those set forth in the examples.

The foregoing disclosure of this invention is not to be considered as limiting since many variations may be made by those skilled in the art without departing from the scope or spirit of the following claims.

We claim:
1. A method for treating a water-insoluble Werner complex composed of a heterocyclic nitrogen base coordinated with a water-soluble metal salt to recover therefrom a water solution of said metal salt and free heterocyclic nitrogen base, which comprises (1) dissolving said

Werner complex in an aqueous solution of a volatile nitrogen base boiling below water and having a dissociation constant greater than that of said heterocyclic nitrogen base, (2) extracting the resulting solution with a water-insoluble organic solvent to extract said heterocyclic base thereby forming an organic extract phase and an aqueous raffinate phase, (3) recovering heterocyclic base from said extract phase, and (4) boiling said aqueous raffinate phase to expel said volatile nitrogen base and form an aqueous solution of said metal salt.

2. A method as defined in claim 1 wherein said volatile nitrogen base is ammonia.

3. A method as defined in claim 1 wherein said heterocyclic base is a pyridine ring compound, and said metal salt is a thiocyanate of a metal of atomic number 25 to 28.

4. A method for altering the composition of a feed mixture of organic compounds including at least one aromatic compound differing in molecular configuration from another compound in said mixture, which comprises (1) reacting said feed mixture simultaneously with (a) a heterocyclic nitrogen base and (b) a water solution of a metal salt capable of forming a water-insoluble Werner complex with said heterocyclic nitrogen base, thereby forming a Werner complex clathrate with one component of said feed mixture, (2) separating non-clathrated organic compounds from the resulting slurry, (3) dissolving said clathrate in an aqueous solution of a volatile nitrogen base boiling below water and having a dissociation constant greater than that of said heterocyclic base, (4) separating the resulting mixture into an organic phase enriched in the clathrated component of said feed mixture and an aqueous Werner complex-volatile base solution, (5) extracting said aqueous Werner complex-volatile base solution with a water-insoluble organic solvent to extract asid heterocyclic base thereby forming an organic extract phase and an aqueous raffinate phase, (6) recovering heterocyclic base from said extract phase, (7) boiling said aqueous raffinate phase to expel said volatile nitrogen base and form an aqueous solution of said metal salt, and (8) recycling said recovered heterocyclic base and said aqueous metal salt solution to step (1).

5. A method as defined in claim 4 wherein said volatile nitrogen base is ammonia.

6. A method as defined in claim 4 wherein said heterocyclic base is a pyridine ring compound, and said metal salt is a thiocyanate of a metal of atomic number 25 to 28.

7. A method as defined in claim 4 wherein said clathrated organic compound is a benzenoid hydrocarbon.

8. A method as defined in claim 4 wherein said clathrated organic compound is p-xylene.

9. A method for resolving a mixture of di-substituted benzene isomers including a para isomer, which comprises (1) reacting said isomer mixture simultaneously with (a) in 4-alkyl pyridine, and (b) an aqueous solution of a metal salt capable of forming a water-insoluble Werner complex with said 4-alkyl pyridine, thereby forming a Werner complex clathrate with said para isomer, (2) separating the resulting slurry into (a) an un-clathrated isomer phase, (b) a solid clathrate phase, and (c) an aqueous mother liquor, (3) dissolving said clathrate and a volatile nitrogen base in said aqueous mother liquor, said volatile nitrogen base boiling below water and having a dissociation constant greater than about $10^{-6}$, (4) separating the resulting mixture into an enriched para isomer phase and an aqueous Werner complex-volatile base phase, (5) extracting said last-named phase with a water-insoluble organic solvent to extract 4-alkyl pyridine thereby forming an organic extract phase and an aqueous raffinate phase, (6) recovering 4-alkyl pyridine from said extract phase, (7) boiling said aqueous raffinate phase to expel said volatile nitrogen base and form an aqueous solution of said metal salt; and (8) recycling said recovered 4-alkyl pyridine and said aqueous metal salt solution to step (1).

10. A method as defined in claim 9 wherein said volatile nitrogen base is ammonia.

11. A method as defined in claim 9 wherein said metal salt is a thiocyanate of metal of atomic number 25 to 28.

12. A process for resolving a xylene mixture including p-xylene, which comprises (1) reacting said xylene mixture simultaneously with (a) 4-methyl pyridine and (b) an aqueous solution of a metal salt capable of forming a water-insoluble Werner complex with said 4-alkyl pyridine, thereby forming a Werner complex clathrate with said p-vylene, (2) adding to the resulting mixture a saturated hydrocarbon boiling between about 90° and 135° C., (3) separating solid clathrate from the clathration mother liquor, (4) separting said mother liquor into a raffinate hydrocarbon phase and an aqueous mother liquor phase, (5) distilling said raffinate hydrocarbon phase to recover (a) an overhead fraction comprising 4-methyl pyridine and said saturated hydrocarbon and (b) a higher boiling fraction comprising raffinate xylenes, (6) recycling said overhead fraction to said step (2), (7) dissolving said clathrate and a volatile nitrogen base in said aqueous mother liquor phase, said volatile nitrogen base boiling below water and having a dissociation constant greater than about $10^{-6}$, (8) adding to the resulting mixture a saturated hydrocarbon boiling between about 90° and 135° C., (9) separating the resulting mixture into an aqueous Werner complex solution phase and an extract hydrocarbon phase, (10) distilling said extract hydrocarbon phase to recover (a) an overhead fraction comprising 4-methyl pyridine and said saturated hydrocarbon, and (b) a higher boiling fraction comprising enriched p-xylene, (11) recycling said overhead fraction to step (8), (12) extracting said aqueous Werner complex solution phase with a water-insoluble organic solvent to extract 4-methyl pyridine thereby forming an organic extract phase and an aqueous raffinate phase, (13) recovering 4-methyl pyridine from said organic extract phase, (14) boiling said aqueous raffinate phase to expel said volatile nitrogen base and form an aqueous solution of said metal salt; and (15) recycling said recovered 4-methyl pyridine and said aqueous metal salt solution to step (1).

13. A method as defined in claim 12 wherein said volatile nitrogen base is ammonia.

14. A process as defined in claim 12 wherein said metal salt is a thiocyanate of a metal of atomic number 25 to 28.

15. A process as defined in claim 12 wherein said saturated hydrocarbon is a $C_8$ paraffin hydrocarbon.

References Cited in the file of this patent
UNITED STATES PATENTS 2,774,802    Christian            Dec. 18, 1956
2,905,730    Ray et al.           Sept. 22, 1959

UNITED STATES PATENT OFFICE
CERTIFICATE OF CORRECTION

Patent No. 3,043,893                                July 10, 1962.

William D. Schaeffer et al.

It is hereby certified that error appears in the above numbered patent requiring correction and that the said Letters Patent should read as corrected below.

Column 13, line 36, for "asid" read -- said --; line 56, for "in" read -- a --; column 14, line 15, for "of metal" read -- of a metal --; line 22, for "p-vylene" read -- p-xylene --; line 25, for "separting" read -- separating --;

Signed and sealed this 12th day of March 1963.

(SEAL)
Attest:

ESTON G. JOHNSON
Attesting Officer

DAVID L. LADD
Commissioner of Patents